(12) United States Patent
Russ et al.

(10) Patent No.: US 11,454,189 B2
(45) Date of Patent: Sep. 27, 2022

(54) METHODS AND SYSTEMS FOR PORT FUEL INJECTION CONTROL

(71) Applicant: Ford Global Technologies, LLC, Dearborn, MI (US)

(72) Inventors: Stephen George Russ, Canton, MI (US); Joseph Lyle Thomas, Kimball, MI (US); Scott Allan Lehto, Dearborn, MI (US); Christopher Arnold Woodring, Canton, MI (US); Jeanne Wei, Ann Arbor, MI (US); David Shelley, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 15/135,308

(22) Filed: Apr. 21, 2016

(65) Prior Publication Data

US 2016/0377019 A1 Dec. 29, 2016

Related U.S. Application Data

(60) Provisional application No. 62/186,171, filed on Jun. 29, 2015.

(51) Int. Cl.
*F02D 43/00* (2006.01)
*F02D 41/30* (2006.01)
(Continued)

(52) U.S. Cl.
CPC ....... *F02D 41/3094* (2013.01); *F02D 41/221* (2013.01); *F02M 63/029* (2013.01);
(Continued)

(58) Field of Classification Search
CPC .. F02D 41/247; F02D 41/3094; F02D 41/402; F02M 21/0278; F02M 63/029; F02M 69/046
(Continued)

(56) References Cited

U.S. PATENT DOCUMENTS 5,181,493 A * 1/1993 Motoyama ............. F02M 69/08
123/431
5,438,968 A * 8/1995 Johnson ............... F02M 59/027
123/446
(Continued)

FOREIGN PATENT DOCUMENTS

CN 103797234 A 5/2014
CN 104454188 A 3/2015
(Continued)

OTHER PUBLICATIONS

National Intellectual Property Administration of the People's Republic of China, Office Action and Search Report Issued in Application No. 201610517479.5, dated Jul. 9, 2020, 15 pages. (Submitted with Partial Translation).

*Primary Examiner* — Logan M Kraft
*Assistant Examiner* — Joshua Campbell
(74) *Attorney, Agent, or Firm* — Vincent Mastrogiacomo; McCoy Russell LLP

(57) ABSTRACT

Methods and systems are provided for reducing hot fuel vapor formation in a port injection fuel rail. In one example, a method may include operating a dual fuel injection system with at least a calibrated minimum amount of port fuel injection over a wide range of engine operating conditions, even as conditions change. A direct fuel injection amount is adjusted in accordance.

20 Claims, 6 Drawing Sheets

(51) Int. Cl.
*F02D 41/22* (2006.01)
*F02M 63/02* (2006.01)
*F02M 69/04* (2006.01)
*F02D 41/38* (2006.01)
*F02D 19/08* (2006.01)

(52) U.S. Cl.
CPC ......... *F02M 69/046* (2013.01); *F02D 19/084* (2013.01); *F02D 2041/224* (2013.01); *F02D 2041/3881* (2013.01); *F02M 63/0265* (2013.01); *F02M 2200/95* (2013.01); *F02M 2200/956* (2013.01); *Y02T 10/30* (2013.01)

(58) Field of Classification Search
USPC .................................................. 123/322, 333
See application file for complete search history.

(56) References Cited

U.S. PATENT DOCUMENTS

| | | | | |
|---|---|---|---|---|
| 2005/0274353 | A1* | 12/2005 | Okubo | F02M 63/029 123/299 |
| 2006/0090732 | A1* | 5/2006 | Shibagaki | F02M 69/046 123/406.13 |
| 2006/0102149 | A1* | 5/2006 | Furusawa | F02D 41/3094 123/446 |
| 2007/0017484 | A1* | 1/2007 | Kinose | F02D 41/3809 123/431 |
| 2007/0131188 | A1* | 6/2007 | Hokuto | F02D 41/3094 123/179.4 |
| 2009/0090332 | A1* | 4/2009 | Brehob | F02D 41/3094 123/464 |
| 2009/0099756 | A1* | 4/2009 | Demura | F02D 41/064 701/103 |
| 2009/0314255 | A1* | 12/2009 | Boesch | B60K 6/547 123/339.24 |
| 2010/0030451 | A1* | 2/2010 | Lippa | F02D 41/0025 701/104 |
| 2011/0106409 | A1* | 5/2011 | Walter | F02D 43/02 701/103 |
| 2016/0169144 | A1 | 6/2016 | Surnilla et al. | |

FOREIGN PATENT DOCUMENTS

| | | | |
|---|---|---|---|
| DE | 10207053408 A1 | 5/2009 | |
| DE | 102007053408 A1 * | 5/2009 | ......... F02D 41/3863 |
| JP | S6185803 A | 5/1986 | |
| JP | 05001606 A * | 1/1993 | |

* cited by examiner

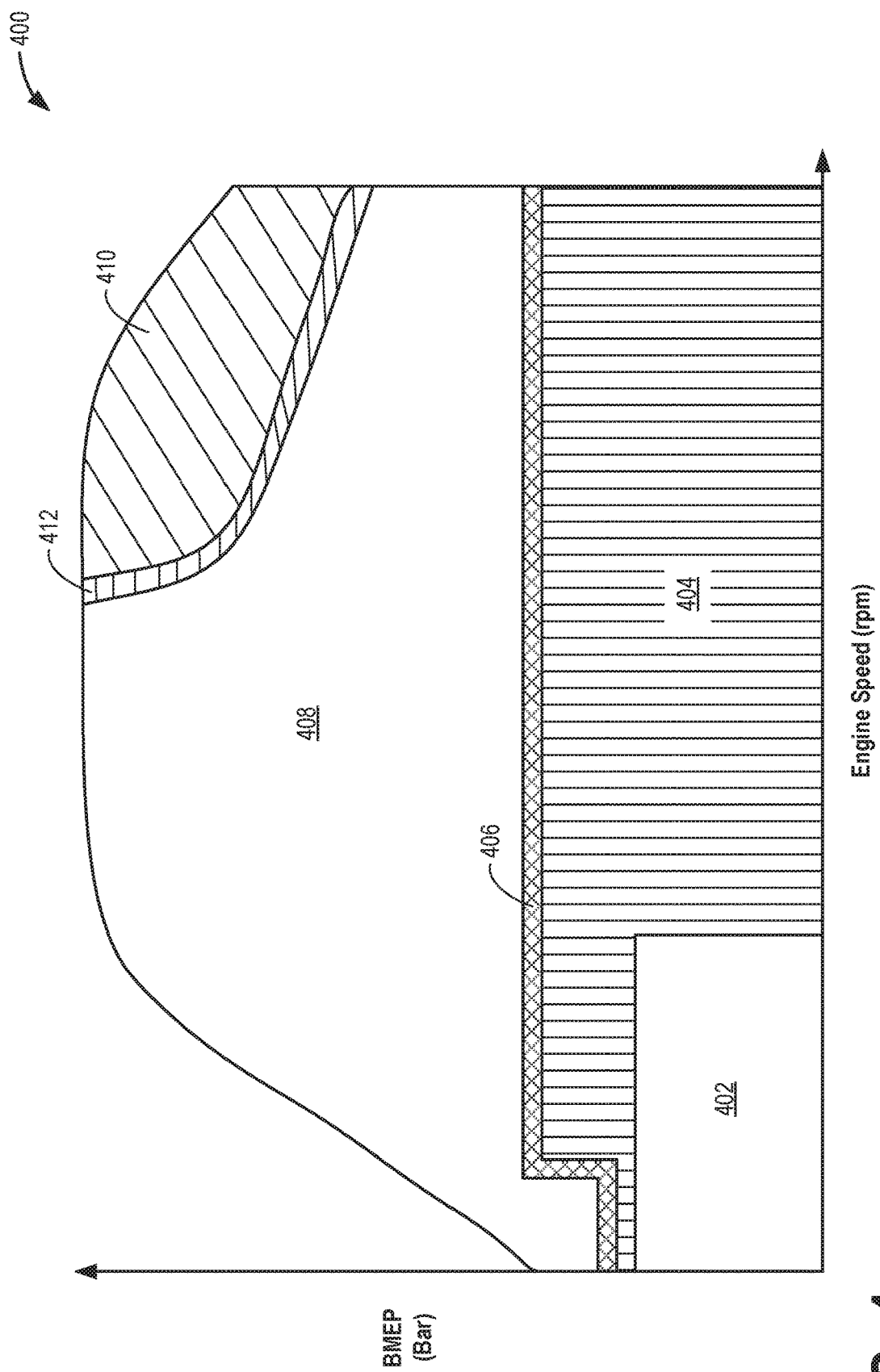

METHODS AND SYSTEMS FOR PORT FUEL INJECTION CONTROL

CROSS REFERENCE TO RELATED APPLICATION

The present application claims priority to U.S. Provisional Patent Application No. 62/186,171, entitled "Methods and Systems for Port Fuel Injection Control," filed on Jun. 29, 2015, the entire contents of which are hereby incorporated by reference for all purposes.

FIELD

The present description relates to systems and methods for adjusting operation of an internal combustion engine that includes high pressure port and direct fuel injectors.

BACKGROUND AND SUMMARY

Direct fuel injection (DI) systems provide some advantages over port fuel injection systems. For example, direct fuel injection systems may improve cylinder charge cooling so that engine cylinders may operate at higher compression ratios without incurring undesirable engine knock. However, direct fuel injectors may not be able to provide a desired amount of fuel to a cylinder at higher engine speeds and loads because the amount of time a cylinder stroke takes is shortened so that there may not be sufficient time to inject a desired amount of fuel. Consequently, the engine may develop less power than is desired at higher engine speeds and loads. In addition, direct injection systems may be more prone to particulate matter emissions. In comparison, port injection systems can offer improved mixing and lower smoke at light loads. As a result, both fuel systems may be included in engine systems to leverage the advantages of both injection types.

In an effort to reduce the particulate matter emissions and fuel dilution in oil, very high pressure direct injection systems have been developed. For example, while nominal direct injection maximum pressures are in the range of 150 bar, the higher pressure DI systems may operate in the range of 250-800 bar using a high pressure piston pump that is mechanically driven by the engine via a camshaft. In engines configured with dual injection systems, that is engines enabled with both direct and port fuel injectors, pressurized fuel from the fuel tank may be supplied to both the direct injection high pressure fuel pump (HPFP) as well as the port injection fuel rail. In order to reduce hardware complexity, the fuel may be supplied to the port injection fuel rail either through the HPFP, or may be branched off before the pump, thereby reducing the need for a dedicated pump for the port injection fuel rail.

However, one issue with such dual fuel injection system configurations is that during conditions when there is no fuel flowing through the port injection system (such as when only direct injection is enabled), fuel vapor can form in the port injection fuel system. This can result in fueling errors and lean operation when port injection is enabled.

In one example, the issues described above may be addressed by a method for an engine having a dual fuel injection system comprising: pressurizing fuel in each of a port injection fuel rail and a direct injection fuel rail via an engine-driven high pressure fuel pump; and during a non-degradation mode of the fuel injection system (such as over any and every engine warmed-up operating condition while in the non-degradation mode), fueling the engine with at least a calibrated minimum amount greater than zero of port injected fuel for every combustion event. In this way, formation of hot fuel vapors in a port injection fuel rail can be reduced.

As one example, an engine system may include a fuel system with an engine-driven high pressure fuel pump supplying fuel to each of a port and direct injection fuel rail. When the fuel system is in a non-degradation mode (that is, when none of the fuel system components are degraded), during all ranges of non-starting engine combusting conditions, where the engine is warmed up, the engine may be fueled with at least a calibrated minimum amount (e.g., at least 10%) of port injected fuel. Further, the engine may be operated with at least the calibrated amount of port injected fuel even as engine speed-load conditions change. A remainder of the fuel demand may be provided as a direct fuel injection. As a result, there may be non-starting engine combusting conditions where the engine is operated with partial direct injection, or with no direct injection (and only port injection). Even during conditions when fuel is requested to be delivered as only a direct injection (such as high speed-load conditions where the engine may be knock limited), the fuel demand is met by port fueling the engine with the calibrated minimum amount and then delivering the remaining bulk of the fuel primarily as a direct injection. As an example, during engine hot-start conditions, the engine may be fueled via port injection only. At low speed-low load conditions, the engine may be operated with the calibrated minimum amount of port injected fuel and the bulk of the fuel delivered via direct injection. Then, at high speed-low load conditions, engine fueling may be transitioned to a larger portion of port injected fuel and a smaller portion of direct injected fuel. At mid to high load conditions, engine fueling may be transitioned back to the calibrated minimum amount of port injected fuel and the remainder of the fuel delivered via direct injection. At high speed-high load conditions, the engine fueling may then be transitioned to a smaller portion of port injected fuel (but above the calibrated minimum amount) and a larger portion of direct injected fuel. As such, the calibrated minimum amount may be adjusted to maintain fuel temperature at the port injection fuel rail below a temperature that causes hot vapor formation, such as below approximately 100° C., depending on fuel type and lift pump pressure. It will be appreciated that the engine may be fueled with a different fueling profile when in a degradation mode, the profile in that mode selected based on the component that is degraded.

In this way, fueling errors due to vapor formation in a port injection fuel rail can be reduced. The technical effect of trickling at least a calibrated minimum fuel amount through the port injection fuel rail even when primarily fueling the engine via direct injection is that fuel temperatures at the port injection fuel rail can be maintained sufficiently low. As a result, boiling of fuel at the port fuel rail is reduced. In addition, the need for a temperature sensor integrated into the port injection fuel rail is averted. As such, this provides component reduction benefits. In addition, by maintaining the delivery of at least the calibrated minimum fuel over all engine operating conditions, including as engine speed-load conditions change, temperature control is achieved in a simpler and more cost-effective manner.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows an example port fuel injection calibration table.

DETAILED DESCRIPTION

Figure 5:
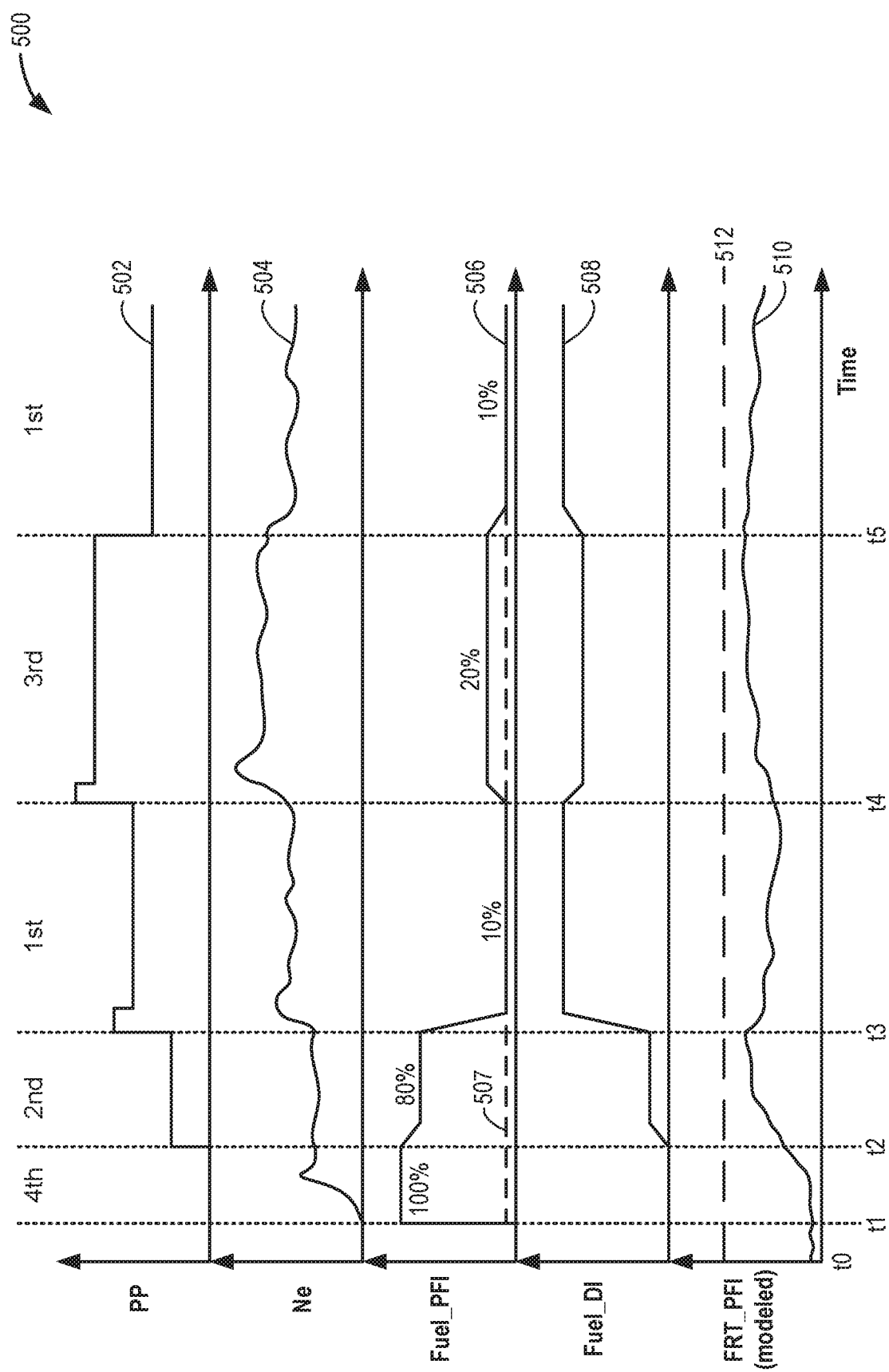
FIG. 5 shows an example of adjusting a fraction of fuel delivered as port fuel injection to reduce hot fuel vapor formation.

The following detailed description provides information regarding a dual fuel injection system and a method for reducing fuel vapor formation at a port injection fuel rail. An example embodiment of a cylinder in an internal combustion engine is given in FIG. 1 while FIG. 2 depicts an example fuel system that may be used with the engine of FIG. 1. A controller may be configured to perform a control routine, such as the example routine of FIGS. 3A-3B, to adjust a port fuel injection amount based on engine speed-load conditions based on input from a calibrated map (FIG. 4), and independent of fuel rail temperature, to reduce fuel vapor formation at the port injection rail. An example port fuel injection adjustment is shown at FIG. 5.

Regarding terminology used throughout this detailed description, a high pressure pump, or direct injection pump, may be abbreviated as a DI or HP pump. Similarly, a low pressure pump, or lift pump, may be abbreviated as a LP pump. Port fuel injection may be abbreviated as PFI while direct injection may be abbreviated as DI. Also, fuel rail pressure, or the value of pressure of fuel within a fuel rail, may be abbreviated as FRP. Also, the mechanically operated inlet check valve for controlling fuel flow into the HP pump may also be referred to as the spill valve. As discussed in more detail below, an HP pump that relies on mechanical pressure regulation without use of an electronically-controlled inlet valve may be referred to as a mechanically-controlled HP pump, or HP pump with mechanically-regulated pressure. Mechanically-controlled HP pumps, while not using electronically-controlled inlet valves for regulating a volume of fuel pumped, may provide one or more discrete pressures based on electronic selection.

Figure 1:
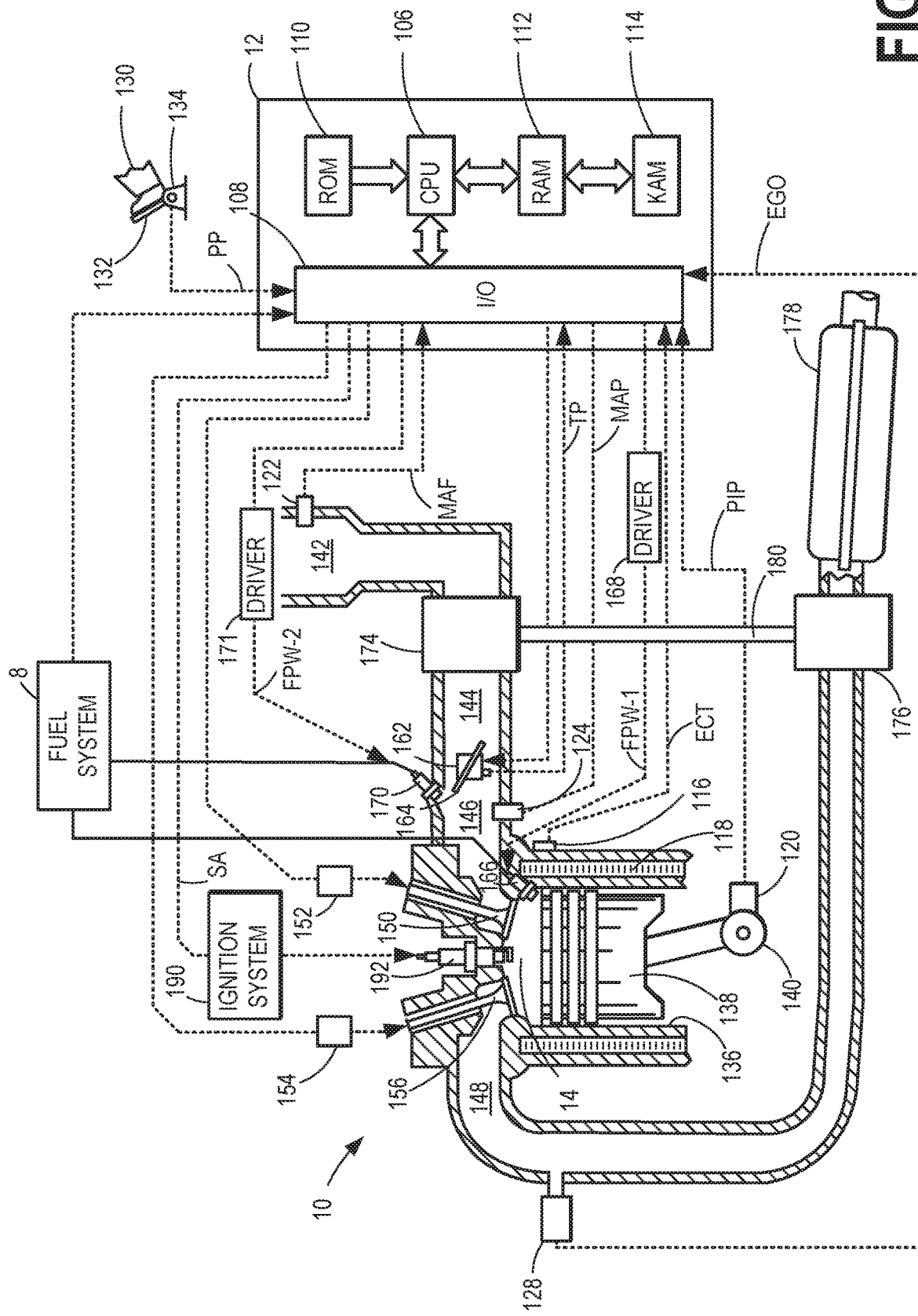
FIG. 1 schematically depicts an example embodiment of a cylinder of an internal combustion engine.
Figure 2:
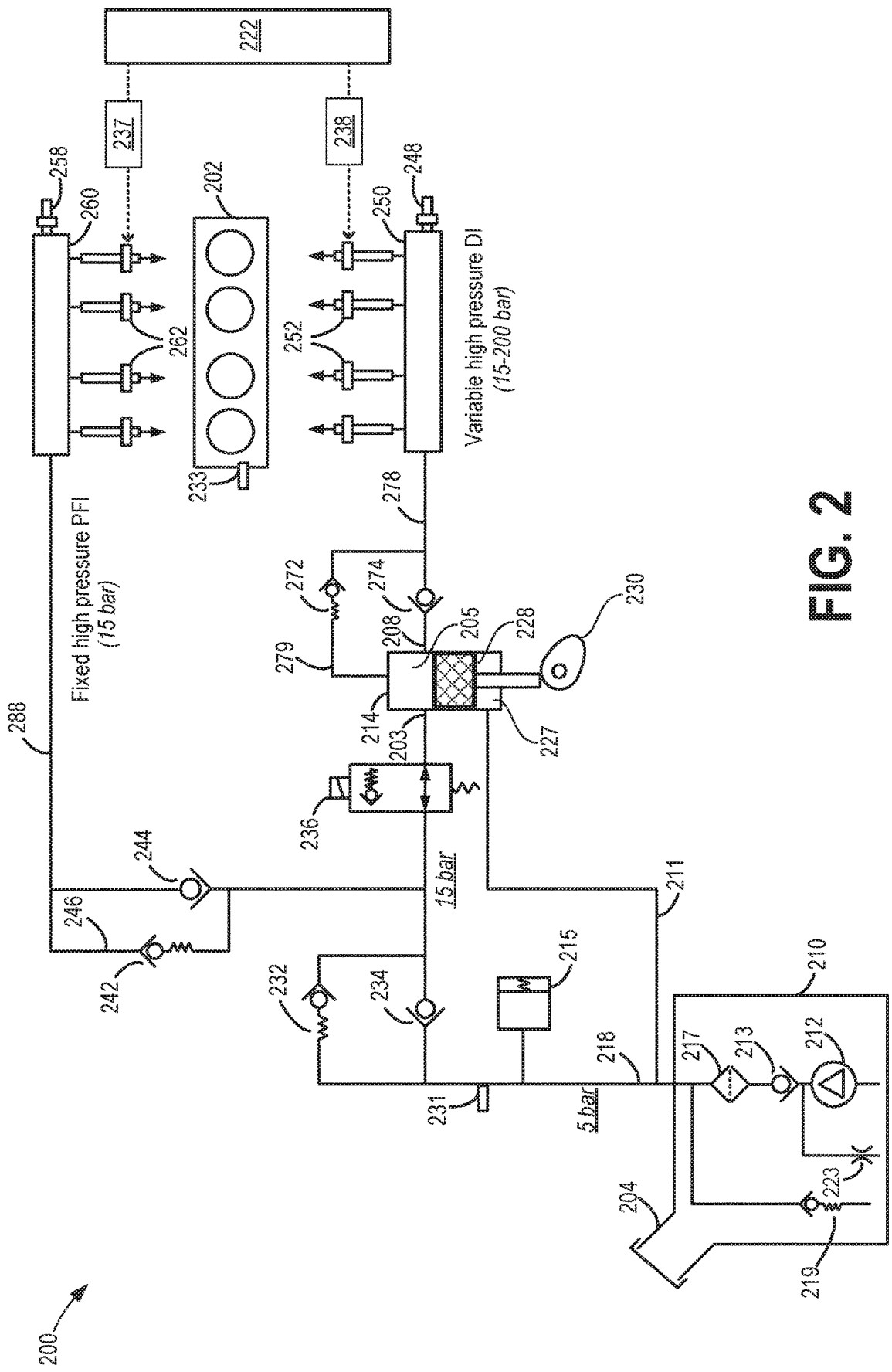
FIG. 2 schematically depicts an example embodiment of a fuel system configured for high pressure port injection and high pressure direct injection that may be used with the engine of FIG. 1.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIG. 2, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 (and FIG. 2) and employs the various actuators of FIG. 1 (and FIG. 2) to adjust engine operation based on the received signals and instructions stored on a memory of the controller FIG. 2 schematically depicts an example embodiment 200 of a fuel system, such as fuel system 8 of FIG. 1. Fuel system 200 may be operated to deliver fuel to an engine, such as engine 10 of FIG. 1. Fuel system 200 may be operated by a controller to perform some or all of the operations described with reference to the process flow of FIG. 3.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group). Fuel lifted by the LPP 212 may also be supplied to a second fuel rail 260 coupled to one or more fuel injectors of a second group of port injectors 262 (herein also referred to as a second injector group). As elaborated below, HPP 214 may be operated to raise the pressure of fuel delivered to each of the first and second fuel rail above the lift pump pressure, with the first fuel rail coupled to the direct injector group operating with a variable high pressure while the second fuel rail coupled to the port injector group operates with a fixed high pressure. As a result, high pressure port and direct injection may be enabled. The high pressure fuel pump is coupled downstream of the low pressure lift pump with no additional pump positioned in between the high pressure fuel pump and the low pressure lift pump.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. Controller 222 can individually actuate each of the port injectors 262 via a port injection driver 237 and actuate each of the direct injectors 252 via a direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a BOSCH HDP5 HIGH PRESSURE PUMP, which utilizes a solenoid activated control valve (e.g., fuel volume regulator, magnetic solenoid valve, etc.) 236 to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222.

Fuel system 200 may optionally further include accumulator 215. When included, accumulator 215 may be positioned downstream of lower pressure fuel pump 212 and upstream of higher pressure fuel pump 214, and may be configured to hold a volume of fuel that reduces the rate of fuel pressure increase or decrease between fuel pumps 212 and 214. For example, accumulator 215 may be coupled in fuel passage 218, as shown, or in a bypass passage 211 coupling fuel passage 218 to the step-room 227 of HPP 214. The volume of accumulator 215 may be sized such that the engine can operate at idle conditions for a predetermined period of time between operating intervals of lower pressure fuel pump 212. For example, accumulator 215 can be sized such that when the engine idles, it takes one or more minutes to deplete pressure in the accumulator to a level at which higher pressure fuel pump 214 is incapable of maintaining a sufficiently high fuel pressure for fuel injectors 252, 262. Accumulator 215 may thus enable an intermittent operation mode (or pulsed mode) of lower pressure fuel pump 212. By reducing the frequency of LPP operation, power consumption is reduced. In other embodiments, accumulator 215 may inherently exist in the compliance of fuel filter 217 and fuel passage 218, and thus may not exist as a distinct element.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212. While lift pump fuel pressure sensor 231 is shown as being positioned downstream of accumulator 215, in other embodiments the sensor may be positioned upstream of the accumulator.

First fuel rail 250 includes a first fuel rail pressure sensor 248 for providing an indication of direct injection fuel rail pressure to the controller 222. Likewise, second fuel rail 260 includes a second fuel rail pressure sensor 258 for providing an indication of port injection fuel rail pressure to the controller 222. An engine speed sensor 233 can be used to provide an indication of engine speed to the controller 222. The indication of engine speed can be used to identify the speed of higher pressure fuel pump 214, since the pump 214 is mechanically driven by the engine 202, for example, via the crankshaft or camshaft.

First fuel rail 250 is coupled to an outlet 208 of HPP 214 along fuel passage 278. In comparison, second fuel rail 260 is coupled to an inlet 203 of HPP 214 via fuel passage 288. A check valve and a pressure relief valve may be positioned between the outlet 208 of the HPP 214 and the first fuel rail. In addition, pressure relief valve 272, arranged parallel to check valve 274 in bypass passage 279, may limit the pressure in fuel passage 278, downstream of HPP 214 and upstream of first fuel rail 250. For example, pressure relief valve 272 may limit the pressure in fuel passage 278 to 200 bar. As such, pressure relief valve 272 may limit the pressure that would otherwise be generated in fuel passage 278 if control valve 236 were (intentionally or unintentionally) open and while high pressure fuel pump 214 were pumping.

One or more check valves and pressure relief valves may also be coupled to fuel passage 218, downstream of LPP 212 and upstream of HPP 214. For example, check valve 234 may be provided in fuel passage 218 to reduce or prevent back-flow of fuel from high pressure pump 214 to low pressure pump 212 and fuel tank 210. In addition, pressure relief valve 232 may be provided in a bypass passage, positioned parallel to check valve 234. Pressure relief valve 232 may limit the pressure to its left to 10 bar higher than the pressure at sensor 231.

Controller 222 may be configured to regulate fuel flow into HPP 214 through control valve 236 by energizing or de-energizing the solenoid valve (based on the solenoid valve configuration) in synchronism with the driving cam. Accordingly, the solenoid activated control valve 236 may be operated in a first mode where the valve 236 is positioned within HPP inlet 203 to limit (e.g., inhibit) the amount of fuel traveling through the solenoid activated control valve 236. Depending on the timing of the solenoid valve actuation, the volume transferred to the fuel rail 250 is varied. The solenoid valve may also be operated in a second mode where the solenoid activated control valve 236 is effectively disabled and fuel can travel upstream and downstream of the valve, and in and out of HPP 214.

As such, solenoid activated control valve 236 may be configured to regulate the mass (or volume) of fuel compressed into the direct injection fuel pump. In one example, controller 222 may adjust a closing timing of the solenoid pressure control check valve to regulate the mass of fuel compressed. For example, a late pressure control valve closing may reduce the amount of fuel mass ingested into compression chamber 205. The solenoid activated check valve opening and closing timings may be coordinated with respect to stroke timings of the direct injection fuel pump.

Pressure relief valve 232 allows fuel flow out of solenoid activated control valve 236 toward the LPP 212 when pressure between pressure relief valve 232 and solenoid operated control valve 236 is greater than a predetermined pressure (e.g., 10 bar). When solenoid operated control valve 236 is deactivated (e.g., not electrically energized), solenoid operated control valve operates in a pass-through mode and pressure relief valve 232 regulates pressure in compression chamber 205 to the single pressure relief set-point of pressure relief valve 232 (e.g., 10 bar above the pressure at sensor 231). Regulating the pressure in compression chamber 205 allows a pressure differential to form from the piston top to the piston bottom. The pressure in step-room 227 is at the pressure of the outlet of the low pressure pump (e.g., 5 bar) while the pressure at piston top is at pressure relief valve regulation pressure (e.g., 15 bar). The pressure differential allows fuel to seep from the piston top to the piston bottom through the clearance between the piston and the pump cylinder wall, thereby lubricating HPP 214.

Piston 228 reciprocates up and down. HPP 214 is in a compression stroke when piston 228 is traveling in a direction that reduces the volume of compression chamber 205. HPP 214 is in a suction stroke when piston 228 is traveling in a direction that increases the volume of compression chamber 205.

A forward flow outlet check valve 274 may be coupled downstream of an outlet 208 of the compression chamber 205. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. Thus, during conditions when direct injection fuel pump operation is not requested, controller 222 may deactivate solenoid activated control valve 236 and pressure relief valve 232 regulates pressure in compression chamber 205 to a single substantially constant pressure during most of the compression stroke. On the intake stroke the pressure in compression chamber 205 drops to a pressure near the pressure of the lift pump (212). Lubrication of DI pump 214 may occur when the pressure in compression chamber 205 exceeds the pressure in step-room 227. This difference in pressures may also contribute to pump lubrication when controller 222 deactivates solenoid activated control valve 236. One result of this regulation method is that the fuel rail is regulated to a minimum pressure, approximately the pressure relief of pressure relief valve 232. Thus, if pressure relief valve 232 has a pressure relief setting of 10 bar, the fuel rail pressure becomes 15 bar because this 10 bar adds to the 5 bar of lift pump pressure. Specifically, the fuel pressure in compression chamber 205 is regulated during the compression stroke of direct injection fuel pump 214. Thus, during at least the compression stroke of direct injection fuel pump 214, lubrication is provided to the pump. When direct fuel injection pump enters a suction stroke, fuel pressure in the compression chamber may be reduced while still some level of lubrication may be provided as long as the pressure differential remains. Another pressure relief valve 272 may be placed in parallel with check valve 274. Pressure relief valve 272 allows fuel flow out of the DI fuel rail 250 toward pump outlet 208 when the fuel rail pressure is greater than a predetermined pressure. As such, while the direct injection fuel pump is reciprocating, the flow of fuel between the piston and bore ensures sufficient pump lubrication and cooling.

The lift pump may be transiently operated in a pulsed mode where the lift pump operation is adjusted based on a pressure estimated at the outlet of the lift pump and inlet of the high pressure pump. In particular, responsive to high pressure pump inlet pressure falling below a fuel vapor pressure, the lift pump may be operated until the inlet pressure is at or above the fuel vapor pressure. This reduces the risk of the high pressure fuel pump ingesting fuel vapors (instead of fuel) and ensuing engine stall events.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Solenoid activated control valve 236 may also be operated to direct fuel back-flow from the high pressure pump to one of pressure relief valve 232 and accumulator 215. For example, control valve 236 may be operated to generate and store fuel pressure in accumulator 215 for later use. One use of accumulator 215 is to absorb fuel volume flow that results from the opening of compression pressure relief valve 232. Accumulator 227 sources fuel as check valve 234 opens during the intake stroke of pump 214. Another use of accumulator 215 is to absorb/source the volume changes in the step room 227. Yet another use of accumulator 215 is to allow intermittent operation of lift pump 212 to gain an average pump input power reduction over continuous operation.

While the first direct injection fuel rail 250 is coupled to the outlet 208 of HPP 214 (and not to the inlet of HPP 214), second port injection fuel rail 260 is coupled to the inlet 203 of HPP 214 (and not to the outlet of HPP 214). Although inlets, outlets, and the like relative to compression chamber 205 are described herein, it may be appreciated that there may be a single conduit into compression chamber 205. The single conduit may serve as inlet and outlet. In particular, second fuel rail 260 is coupled to HPP inlet 203 at a location upstream of solenoid activated control valve 236 and downstream of check valve 234 and pressure relief valve 232. Further, no additional pump may be required between lift pump 212 and the port injection fuel rail 260. As elaborated below, the specific configuration of the fuel system with the port injection fuel rail coupled to the inlet of the high pressure pump via a pressure relief valve and a check valve enables the pressure at the second fuel rail to be raised via the high pressure pump to a fixed default pressure that is above the default pressure of the lift pump. That is, the fixed high pressure at the port injection fuel rail is derived from the high pressure piston pump.

When the high pressure pump 214 is not reciprocating, such as at key-up before cranking, check valve 244 allows the second fuel rail to fill at 5 bar. As the pump chamber displacement becomes smaller due to the piston moving upward, the fuel flows in one of two directions. If the spill valve 236 is closed, the fuel goes into the high pressure fuel rail 250. If the spill valve 236 is open, the fuel goes either into the low pressure fuel rail 250 or through the compression relief valve 232. In this way, the high pressure fuel pump is operated to deliver fuel at a variable high pressure (such as between 15-200 bar) to the direct fuel injectors 252 via the first fuel rail 250 while also delivering fuel at a fixed high pressure (such as at 15 bar) to the port fuel injectors 262 via the second fuel rail 260. The variable pressure may include a minimum pressure that is at the fixed pressure (as in the system of FIG. 2). In the configuration depicted at FIG. 2, the fixed pressure of the port injection fuel rail is the same as the minimum pressure for the direct injection fuel rail, both being higher than the default pressure of the lift pump. Herein, the fuel delivery from the high pressure pump is controlled via the upstream (solenoid activated) control valve and further via the various check valve and pressure relief valves coupled to the inlet of the high pressure pump. By adjusting operation of the solenoid activated control valve, the fuel pressure at the first fuel rail is raised from the fixed pressure to the variable pressure while maintaining the fixed pressure at the second fuel rail. Valves 244 and 242 work in conjunction to keep the low pressure fuel rail 260 pressurized to 15 bar during the pump inlet stroke. Pressure relief valve 242 simply limits the pressure that can build in fuel rail 250 due to thermal expansion of fuel. A typical pressure relief setting may be 20 bar.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 222 may be used to send a control signal to the low pressure pump, as required, to adjust the output (e.g. speed) of the low pressure pump.

The embodiment depicted at FIG. 2 shows a first fuel system configuration wherein fuel is supplied to the port injection fuel rail from the fuel tank by branching off before the high pressure direct injection fuel pump (HPFP). It will be appreciated, however, that in alternate embodiments, fuel may be supplied to the port injection fuel rail from the fuel tank via the high pressure direct injection fuel pump.

Figure 3A:
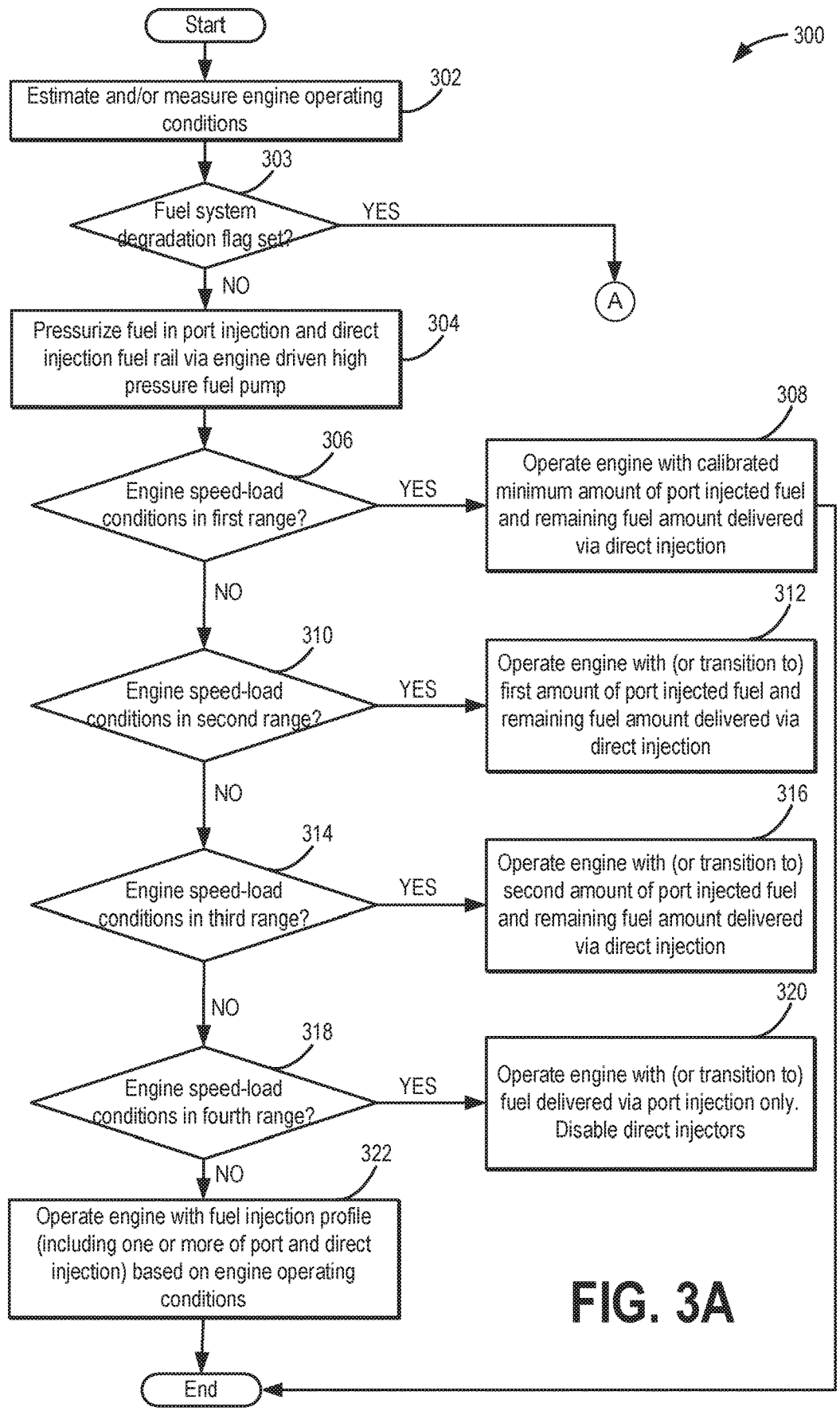
FIGS. 3A-3B show a flow chart of a method for adjusting a port injection fuel fraction as engine conditions change independent of fuel rail temperature during conditions when fuel system components are not degraded.
Figure 3B:
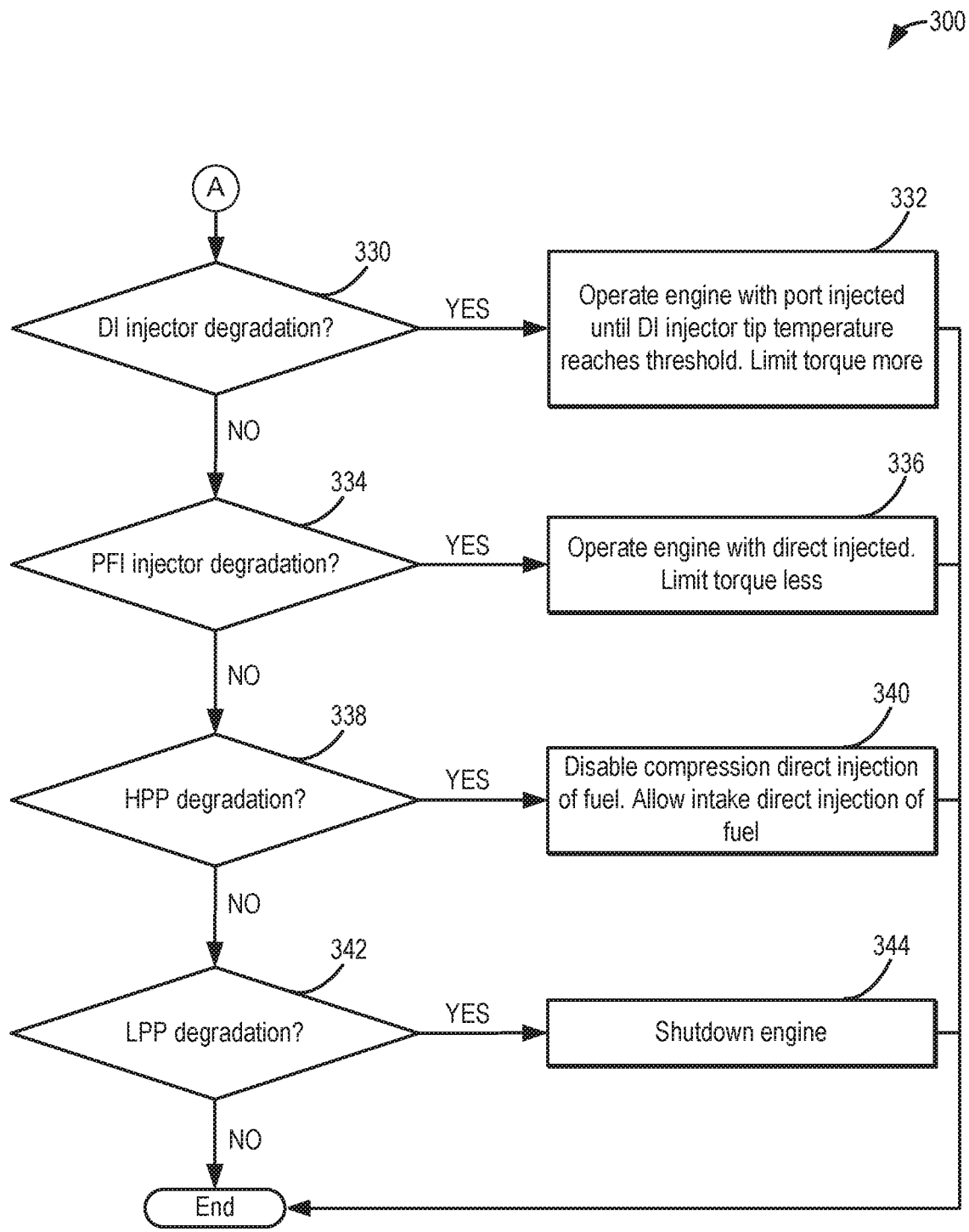

Now turning to FIGS. 3A-3B, an example method 300 is shown for operating an engine with at least a calibrated minimum amount of port injected fuel over any and every engine non-start combusting condition, including as engine speed-load conditions change. The method enables fuel vapor formation at a port injection fuel rail to be reduced.

At 302, the method includes estimating and/or measuring engine operating conditions. These may include, for example, engine speed, engine load, engine temperature, driver torque demand, ambient conditions (ambient temperature, pressure, and humidity), etc.

At 303, the method includes confirming is a fuel system degradation flag has been set. In one example, a fuel system degradation flag may be set in response to degradation of a component of the fuel system, such as degradation of a fuel injector or a fuel pump. If a flag is set, a degradation mode (of failure mode) of the fuel system may be confirmed and the routine adjusts fuel system operation and fuel injection profiles in view of the type of component degradation identified, as elaborated at FIG. 3B. Else, if a flag has not been set, a non-degradation mode (or non-failure mode) of the fuel system may be confirmed and the routine proceeds to 304.

At 304, upon confirming that the fuel system is in the non-degradation mode, the method includes pressuring fuel in each of a port injection fuel rail and a direct injection fuel rail via an engine-driven high pressure fuel pump. For example, the pump may be operated to raise the fuel pressure at the direct injection fuel rail to 20-250 bar and the fuel pressure at the port injection fuel rail adjusted by the lift pump in a range between 400-500 kPa and passed through the high pressure pump to the port injection rail based on feedback from a port injection rail mounted pressure temperature sensor.

Subsequently, engine speed-load conditions may be assessed to identify an operating range of the engine. Engine fueling is then adjusted based on the operating range of the engine, while providing at least a calibratible minimum amount of port injected fuel to the engine over any and every warmed-up engine combusting condition.

Specifically, at 306, it may be determined if the speed-load conditions of the warmed-up combusting engine are in a first range. The first range includes engine speed above a first threshold speed (e.g., above 500 rpm) and engine load above a first threshold load (e.g., above 6 bar). As such, the first range corresponds to an engine non-starting condition where the engine is warmed-up. If the engine speed-load condition is determined to be in the first range, then at 308, the method includes operating the engine with a calibrated minimum amount of port injected fuel and delivering a remaining amount of fuel via direct injection. The calibrated minimum port fuel injection amount is a non-zero amount, specifically, an amount greater than zero. The calibrated minimum port fuel injection amount may be determined independent of a measured fuel temperature of the port injection fuel rail. For example, the calibrated minimum port fuel injection amount may be determined based on a modeled fuel temperature of the port injection fuel rail. As such, by not requiring a fuel temperature of the port injection fuel rail to be measured, the need for an integrated temperature (or pressure) sensor is reduced, providing component reduction benefits. As such, this allows port injection rail fuel boiling issues to be addressed without requiring fuel temperature to be actively assessed or measured.

Further, the engine operation may include maintaining port fuel injection at the calibrated minimum amount as engine speed and load conditions change within the first range. For example, when operating in the first range, the engine may be fueled with 10% port injected fuel and 90% direct injected fuel even as engine speed and load changes (e.g., as engine speed changes from 500 rpm to 4500 rpm, and/or an engine load changes from 6 bar to 24 bar).

If the engine speed-load conditions are not in the first range, or after setting fuel parameters as discussed above in the first range, the method moves to 310 where it may be determined if the speed-load conditions of the warmed-up combusting engine are in a second range. The second range includes engine speed above a second threshold speed, higher than the first threshold speed (e.g., above 2500 rpm) and engine load below the first threshold load (e.g., below 7 bar). The second range may alternatively comprise two range sections, such as a first section including engine speed above the second threshold speed, higher than the first threshold speed (e.g., above 2500 rpm) and engine load below the first threshold load (e.g., below 7 bar), and a second section including engine speed starting above the first threshold speed and a below the second threshold speed (e.g., starting above 750 rpm) and engine load below the first threshold and above a third threshold load (e.g., from 5 bar to 7 bar, and not below 5 bar or above 7 bar).

As such, the second range corresponds to an engine non-starting condition where the engine is warmed-up or idle. If the engine speed-load condition is determined to be in the second range, then at 312, the method includes operating the engine with a first amount of port injected fuel, the first amount higher than the calibrated minimum amount of port injected fuel, and delivering a remaining amount of fuel via direct injection. For example, an engine controller may send a signal to the fuel injectors to adjust a duty cycle of the port and direct fuel injectors to thereby transition port fuel injection from the calibrated minimum amount to the first amount responsive to change in engine speed-load conditions from the first range to the second range. Herein, the transitioning may include the controller sending a signal to increase the duty cycle pulse width of the port injector and correspondingly decreasing the duty cycle pulse width of the direct fuel injector. Further, the controller may maintain port fuel injection at the first amount as engine speed and load conditions change within the second range. For example, when operating in the second range, the engine may be fueled with 80% port injected fuel and 20% direct injected fuel even as engine speed and load changes (e.g., as engine speed changes from 2500 rpm to 6000 rpm, and/or an engine load changes from 1 bar to 7 bar).

Further, there may be a first transitional engine speed-load range in between the first and the second range. In one example, the first transitional engine speed-load range may be a subset of the first range. In an alternate example, the first transitional engine speed-load range may be a subset of the second range. If the engine speed-load conditions are determined to be in the first transitional range, the port fuel injection amount may be set to a linearly interpolated value between the calibrated minimum amount delivered in the first range, and the first amount delivered in the second range. As an example, the first engine speed-load range may comprise a speed-load range from 500 rpm to 6000 rpm in engine speed and from 8 bar to 24 bar in engine load (but not including the combination of both above 4500 rpm and above 16 bar), while the second range may comprise a speed-load range from 750 rpm to 6000 rpm in engine speed and from 1 bar to 7 bar in engine load (but not including the combination of both below 2500 rpm and below 5 bar). A first transitional range may then correspond to the band between the first and second ranges, specifically, between 7 bar and 8 bar in engine load at all engine speeds between 750 rpm and 6000 rpm. Based on the engine operating position within the first transitional range, the port fuel injection amount may be adjusted. For example, when the engine operating position is within the first transitional range closer to the first range (e.g., closer to 7 bar than 8 bar), the port fuel injection amount may be linearly extrapolated (herein increased) from the calibrated minimum amount (of the first range) towards the first amount (of the second range). As another example, when the engine operating position is within the first transitional range closer to the second range (e.g., closer to 8 bar than 7 bar), the port fuel injection amount may be linearly extrapolated (herein decreased) from first amount (of the second range) towards the calibrated minimum amount (of the first range).

If the engine speed-load conditions are not in the second range, or after setting fuel parameters as discussed above in the second range, the method moves to 314 where it may be determined if the speed-load conditions of the warmed-up combusting engine are in a third range. The third range includes engine speed above a third threshold speed, higher than the second (and therefore also higher than the first threshold speed, for example, above 4500 rpm) and engine load above a second threshold load, higher than the first threshold load (e.g., above 17 bar). As such, the third range corresponds to an engine non-starting condition where the engine is warmed-up, and further where the engine may become knock limited. If the engine speed-load condition is determined to be in the third range, then at 316, the method includes operating the engine with a second amount of port injected fuel, the second amount lower than the first amount and higher than the calibrated minimum amount of port injected fuel, and delivering a remaining amount of fuel via direct injection. For example, an engine controller may send a signal to the fuel injectors to adjust a duty cycle of the port and direct fuel injectors to thereby transition port fuel injection from the calibrated minimum amount to the second amount responsive to change in engine speed-load conditions from the first range to the third range. Herein, the transitioning may include the controller sending a signal to increase the duty cycle pulse width of the port injector and correspondingly decrease the duty cycle pulse width of the direct fuel injector. Further, the controller may maintain port fuel injection at the second amount as engine speed and load conditions change within the third range. For example, when operating in the third range, the engine may be fueled with 20% port injected fuel and 80% direct injected fuel even as engine speed and load changes (e.g., as engine speed changes from 4500 rpm to 6000 rpm, and/or an engine load changes from 17 bar to 24 bar).

Further, there may be a second transitional engine speed-load range in between the first and the third range. In one example, the second transitional engine speed-load range may be a subset of the first range. In an alternate example, the second transitional engine speed-load range may be a subset of the third range. If the engine speed-load conditions are determined to be in the second transitional range, the port fuel injection amount may be set to a linearly interpolated value between the calibrated minimum amount delivered in the first range, and the second amount delivered in the third range. As an example, the first engine speed-load range may comprise a speed-load range from 500 rpm to 6000 rpm in engine speed and from 8 bar to 24 bar in engine load (but not including the combination of both above 4500 rpm and above 16 bar), while the third range may comprise a speed-load range from 4500 rpm to 6000 rpm in engine speed and from 17 bar to 24 bar in engine load (with the higher engine load of the third range at the lower speed of the third range, and the lower engine load at the higher engine speed of the third range). A second transitional range may then correspond to the band between the first and third ranges. Based on the engine operating position within the second transitional range, the port fuel injection amount may be adjusted. For example, when the engine operating position is within the second transitional range closer to the first range, the port fuel injection amount may be linearly extrapolated (herein increased) from the calibrated minimum amount (of the first range) towards the second amount (of the third range). As another example, when the engine operating position is within the first transitional range closer to the third range, the port fuel injection amount may be linearly extrapolated (herein decreased) from second amount (of the third range) towards the calibrated minimum amount (of the first range).

If the engine speed-load conditions are not in the third range, or after setting fuel parameters as discussed above in the third range, the method moves to 318 where it may be determined if the speed-load conditions of the warmed-up combusting engine are in a fourth range. The fourth range includes engine speed below the second threshold speed (e.g., below 2500 rpm) and engine load below a third threshold load, lower than the first threshold load (e.g., below 5 bar). As such, the fourth range corresponds to an engine non-starting condition where the engine is warmed-up. If the engine speed-load condition is determined to be in the fourth range, then at 320, the method includes operating the engine with fuel delivered by port injection only. For example, an engine controller may send a signal to the fuel injectors to adjust a duty cycle of the port and direct fuel injectors to thereby transition port fuel injection from the calibrated minimum amount to providing all the demanded fuel via port injection responsive to change in engine speed-load conditions from the first range to the fourth range. Herein, the transitioning may include the controller sending a signal to increase the duty cycle pulse width of the port injector and correspondingly decrease the duty cycle pulse width of the direct fuel injector. Further, the controller may maintain delivery of fuel via port fuel injection only as engine speed and load conditions change within the fourth range. For example, when operating in the fourth range, the engine may be fueled with 100% port injected fuel and 0% direct injected fuel even as engine speed and load changes (e.g., as engine speed changes from 500 rpm to 2500 rpm, and/or an engine load changes from 1 bar to 5 bar).

Further, in some embodiments, there may be a third transitional engine speed-load range in between the first and the fourth range, or between the fourth and the second range.

The third transitional engine speed-load range may be a subset of the first range, the second range, or the fourth range. If the engine speed-load conditions are determined to be in the third transitional range, the port fuel injection amount may be set to a linearly interpolated value between the calibrated minimum amount delivered in the first range, and all port fuel injection, or between the first amount delivered in the second range, and all port fuel injection. Based on the engine operating position within the third transitional range, the port fuel injection amount may be adjusted. For example, when the engine operating position is within the third transitional range closer to the fourth range, the port fuel injection amount may be linearly extrapolated (herein increased) from the calibrated minimum amount (of the first range) towards all port injection (of the fourth range). As another example, when the engine operating position is within the third transitional range closer to the fourth range, the port fuel injection amount may be linearly extrapolated (herein decreased) from all port fuel injection towards the calibrated minimum amount (of the first range).

If the engine speed-load condition is not in the fourth range, then at 322, the method includes fueling the engine with a fuel injection profile that is based on engine operating conditions. This may include operating with no port fuel injection and/or operating with less than the calibrated minimum amount of port injected fuel.

The example ranges discussed with reference to the method of FIG. 3 are graphically depicted at FIG. 4 in relation to an engine speed-load map. Map 400 depicts a first engine speed-load range 408 wherein the engine is operated with a calibrated minimum amount of port injected fuel (e.g., 10%) and a remainder of the fuel provided via direct injection. Further, within first range 408, as engine speed or engine load increases or decreases, port fuel injection is maintained at the calibrated amount.

It will be appreciated that in further examples, in response to deceleration fuel shut-off conditions being met (such as when the vehicle is decelerating or drive demand falls below a threshold), the engine controller may further send a signal to the fuel injectors to stop cylinder fuel injection via each of a port injector coupled to the port injection fuel rail, and a direct injector coupled to the direct injection fuel rail. For example, the controller may selectively deactivate the fuel injectors. Cylinder combustion may then be re-enabled responsive to a driver demand increase during a first condition, and during a second condition, combustion may be re-enabled in response to an estimated fuel rail temperature, and without a driver demand increase. For example, fuel combustion may be re-enabled in response to a drop or rise in fuel rail temperature. In addition, when the cylinder combustion is re-enabled, the engine may resume being fueled with at least the calibrated amount of port injected fuel over every and all engine combusting conditions.

Map 400 further depicts a second engine speed-load range 404 wherein the engine is operated with a first amount of port injected fuel (e.g., 80%), higher than the calibrated minimum amount, and a remainder of the fuel provided via direct injection. Further, within second range 404, as engine speed or engine load increases or decreases, port fuel injection is maintained at the first amount.

Map 400 further includes a first transitional region 406 in between the first and the second range. Within the first transitional range, the port fuel injection amount may vary as engine load changes, while remaining the same, for a given load, as engine speed changes. Specifically, as engine load changes, the port fuel injection amount may be set a value that is linearly interpolated between the calibrated minimum amount delivered in the first range, and the first amount delivered in the second range. For example, as engine load decreases (moving from the top of transitional range 406 towards the bottom of the range), the port fuel injection amount may be linearly increased from the calibrated minimum amount towards the first amount.

Map 400 further depicts a third engine speed-load range 410 wherein the engine is operated with a second amount of port injected fuel (e.g., 20%), higher than the calibrated minimum amount, but lower than the first amount. A remainder of the fuel provided via direct injection. Further, within second range 410, as engine speed or engine load increases or decreases, port fuel injection is maintained at the first amount.

Further, a second transitional region 412 is present between the first range 406 and the third range 410. Within the second transitional region 412, the port fuel injection amount may vary as engine load changes, as well as engine speed changes. Specifically, as engine load increases from threshold load of the first range, and as engine speed increases towards the higher end of the first range, the port fuel injection amount may be set a value that is linearly interpolated between the calibrated minimum amount delivered in the first range, and the second amount delivered in the third range. For example, as engine load increases (moving from the first range into transitional range 412), the port fuel injection amount may be linearly increased from the calibrated minimum amount towards the second amount.

Map 400 further depicts a fourth engine speed-load range 402 wherein the engine is operated with all fuel delivered via port injection and with no fuel delivered via direct injection. Further, within fourth range 402, as engine speed or engine load increases or decreases, only port fuel injection is maintained, and direct injection remains disabled.

It will be appreciated that as used herein, the calibrated minimum amount of port injected fuel may be an absolute amount of fuel, or a relative amount or proportion (or ratio) of fuel. For example, the calibrated minimum fuel amount may be 10% (or 0.1), wherein for any and every engine combusting condition, a total fuel amount is determined based on engine speed-load conditions, and then at least 10% of the total fuel is delivered as port injection while a remaining (90% of less) of the fuel is delivered as direct injection.

Returning to 303 (FIG. 3A), if a fuel system degradation flag is set, the method moves to identify the nature of the degradation and adjust fuel system operation and a fuel injection profile accordingly. In particular, at 330 (FIG. 3B), the method includes determining if the flag is set due to an indication of direct injector degradation. If yes, then at 332, the method includes disabling direct injection of fuel and operating the engine with only port injected fuel. As such, when fuel is not delivered via the direct injector, there is a potential for injector tip warming. Thus, during the delivery of fuel via only port injection, the direct injector tip temperature may be continually monitored, and the port injection of fuel may be continued until the direct injector tip temperature reaches a threshold. After that, the port injection may also be disabled. Also, while the direct injector is disabled, engine torque may be limited by a larger amount, such as to a first level of torque.

If the flag is not set due to an indication of direct injector degradation, at 334 the method includes determining if the flag is set due to an indication of port injector degradation. If yes, then at 336, the method includes disabling port injection of fuel and operating the engine with only direct injected fuel. While the direct injector is disabled, engine torque may be limited by a smaller amount, such as to a second level of torque, higher than the first level of torque.

If the flag is not set due to an indication of port injector degradation, at 338 the method includes determining if the flag is set due to an indication of high pressure pump (HPP) degradation. As such, the high pressure pump may be used to deliver fuel at higher pressure to the direct injector and its associated fuel rail. If the HPP is degraded, then at 340, the method includes disabling compression direct injection of fuel (that is, direct injection of fuel during a compression stroke) and only allowing intake direct injection of fuel (that is, direct injection of fuel during an intake stroke).

If the flag is not set due to an indication of HPP degradation, at 342 the method includes determining if the flag is set due to an indication of low pressure pump (LPP) degradation. As such, the low pressure pump may be a lift pump used to lift fuel from a fuel tank and subsequently deliver fuel to the port injector and its associated fuel rail, as well as to the high pressure pump, and thereon to the direct injector and its associated fuel rail. If the LPP is degraded, then at 344, the method includes shutting down the engine as fuel delivery may be impaired.

In this way, during combustion in a warmed engine while the engine is operating above a threshold load, as engine load increases up to an upper load limit, and as engine speed increases up to an upper speed limit, an engine may be fueled with a calibrated minimum amount of port injected fuel and a bulk of the fuel provided as direct injection. Then, as the engine load increases above the upper load limit, and as engine speed increases beyond the upper speed limit, the proportion of port injected fuel delivered to the engine may be increased above the calibrated minimum amount of port injected fuel and a remainder of the fuel provided as direct injection. In comparison, below the threshold load, and as engine speed increases above a lower speed limit, the engine may be fueled with slightly more than a calibrated minimum amount of port injected fuel and a bulk of the remaining fuel provided as direct injection. However, below the threshold load, and as engine speed decreases below the lower speed limit, such as during an engine warm start or during warm engine idle, the engine may be fueled with only port injected fuel and with no fuel provided as direct injection. In other words, during any and every combusting warmed-up engine operating condition, the engine may be operated with either partial direct injection or no direct injection. That is, during any and every combusting warmed-up engine operating condition, the engine is operated with either partial port injection or all port injection.

Thus, as elaborated with reference to the map of FIG. 4, a ratio of fuel delivered via port fuel injection relative to direct fuel injection may be changed as engine speed-load conditions change. Specifically, at a given engine speed, as engine load increases from a minimum load to a maximum load (that is, when going in a straight line up and down on map 400), the ratio of port fuel injection to direct fuel injection is changed while maintaining the port fuel injection at least at the minimum calibrated amount. Herein, the changing includes changing from a first ratio at the given engine speed and the minimum load to a second, different ratio at the given engine speed and the maximum load, each of the first ratio and the second ratio including at least the minimum calibrated amount of port injected fuel. For example, with reference to FIG. 4, the ratio is changed (herein decreased) from a first ratio in the second range (range 404) to a second ratio in the first range (range 408) in response to an increase in engine load, at a given engine speed. As another example, with reference to FIG. 4, the ratio is changed (herein increased) from a first ratio in the first range (range 408) to a second ratio in the third range (range 410) in response to an increase in engine load, at a given engine speed, when the given engine speed is above a threshold speed. Below the threshold speed, as the engine load increases, for a given speed, the ratio is maintained at the first ratio.

In an alternate example, also with reference to FIG. 4, a ratio of fuel delivered via port fuel injection relative to direct fuel injection is changed at a given engine load, as engine speed increases from a minimum speed to a maximum speed (that is, when going in a straight line left to right on map 400), while maintaining the port fuel injection at least at the minimum calibrated amount. Herein, the changing includes changing from a first ratio at the given engine load and the minimum speed to a second, different ratio at the given engine load and the maximum speed, each of the first ratio and the second ratio including at least the minimum calibrated amount of port injected fuel. For example, with reference to FIG. 4, the ratio is changed (herein decreased) from a first ratio in the fourth range (range 402) to a second ratio in the second range (range 404) in response to an increase in engine speed, at a given engine load. As another example, with reference to FIG. 4, the ratio is changed (herein increased) from a first ratio in the first range (range 408) to a second ratio in the third range (range 410) in response to an increase in engine speed, at a given engine load, when the given engine load is above a threshold load. Below the threshold load, as the engine speed increases, for a given load, the ratio is maintained at the first ratio.

Now turning to FIG. 5, an example fuel injection adjustment for an engine coupled in a vehicle is shown. Map 500 depicts pedal position (PP) at plot 502, engine speed at plot 504, a fraction of total fuel delivered by port fuel injection at plot 506, a (remaining) fraction of total fuel delivered by direct fuel injection at plot 508, and a modeled fuel temperature of the port injection fuel rail at plot 510. All plots are shown over time along the x-axis.

Prior to t0, the vehicle engine may be shut down. At t1, the engine may be started. However, the engine start may be a warm start due to the engine being started within a threshold duration since a last engine shutdown (or due to ambient temperatures being sufficiently warm). In response to the engine restart request, the engine may be cranked via a started motor between t0 and t1. At t1, it may be determined that the engine is operating in the fourth range of the engine speed-load map of FIG. 4 due to the engine speed being below a second threshold speed and the engine load being below a third threshold load. Accordingly, the engine may be fueled via only port injection for a duration from t1 to t2. That is, between t1 and t2, no fuel is delivered via direct injection even as engine speed and load changes between t1 and t2 (while staying within the fourth range).

At t2, in response to a pedal tip-in, the engine may transition from the fourth range of the engine speed-load map (of FIG. 4) to the second range of the engine speed-load map (of FIG. 4). That is, engine speed may increase to above the second threshold speed while engine load may increase above the third engine load while remaining below a first threshold load. Accordingly, the engine fueling may be transitioned from being fueled via only port injection to being fueled primarily with port injection (that is, above the calibrated minimum amount 507, such as at 80%) with a remainder of the fuel (such as 20%) delivered via direct injection for a duration from t2 to t3. That is, between t2 and t3, the port fueling ratio is maintained above the calibrated minimum amount even as engine speed and load changes (while staying within the second range).

At t3, in response to another pedal tip-in, the engine may transition from the second range of the engine speed-load map (of FIG. 4) to the first range of the engine speed-load map (of FIG. 4). That is, engine speed may be higher than the second threshold speed while engine load may increase above the first engine load. Accordingly, the engine fueling may be transitioned from being fueled primarily (but not solely) via port injection to being fueled primarily via direct injection. Specifically, herein the port injection is reduced to calibrated minimum amount 507, such as to 10%) with the bulk of the fuel (such as 90%) delivered via direct injection for a duration from t3 to t4. As such, there may be engine speed-load conditions within the first range where only direct fueling is requested (e.g., for knock control). However, such a request is overridden and fuel is delivered primarily via direct injection with port injection maintained at the calibrated minimum amount to enable port fuel rail temperature control (albeit without the need for a dedicated port fuel rail temperature sensor). That is, between t3 and t4, the port fueling ratio is maintained at the calibrated minimum amount even as engine speed and load changes (while staying within the first range).

At t4, in response to another pedal tip-in, the engine may transition from the first range of the engine speed-load map (of FIG. 4) to the third range of the engine speed-load map (of FIG. 4). That is, engine speed may be higher than a third threshold speed while engine load may increase above a second threshold engine load. Accordingly, the engine fueling may be transitioned from being fueled primarily (but not solely) via direct injection to being fueled largely via port injection. Specifically, herein the port injection is increased from the calibrated minimum amount 507 to a higher amount, such as 20% port injection, with the remainder of the fuel (such as 80%) delivered via direct injection for a duration from t4 to t5. That is, between t4 and t5, the port fueling ratio is maintained slightly above the calibrated minimum amount even as engine speed and load changes (while staying within the third range).

At t5, in response to a pedal tip-out, the engine may transition from the third range of the engine speed-load map (of FIG. 4) to the first range of the engine speed-load map (of FIG. 4). That is, engine speed may be reduced by a higher amount while engine load may decrease by a smaller amount. Accordingly, the engine fueling may be transitioned back to being fueled primarily (but not solely) via direct injection. Specifically, herein the port injection is returned to calibrated minimum amount 507, with the bulk of the fuel delivered via direct injection for a duration onwards from t5.

In one example, an example engine method comprises: during a non-degradation mode of a fuel system, pressurizing fuel in each of a port injection fuel rail and a direct injection fuel rail via an engine-driven high pressure fuel pump; and, fueling the engine with at least a calibrated minimum amount greater than zero of port injected fuel for every combustion event. In a further embodiment of the above example, the fueling with at least a calibrated minimum amount is performed independent of a measured fuel temperature of the port injection fuel rail. In any of the above examples, additionally or alternatively, the fueling includes maintaining port fuel injection at the calibrated minimum amount as engine speed and load conditions change within a first range of engine speed-load conditions. In any or all of the above examples, the first range includes engine speed above a first threshold speed and engine load above a first threshold load. In any or all of the above examples, the method may additionally or alternatively further comprise, transitioning port fuel injection from the calibrated minimum amount to a first amount responsive to a change in engine speed and load conditions from the first range to a second range, the second range including engine load below the first threshold load, and engine speed above a second threshold speed, higher than the first threshold speed, the first amount higher than the calibrated minimum amount. In any of the preceding examples comprising the transitioning, the transitioning may include delivering an amount of fuel via port injection, the amount linearly extrapolated between the calibrated minimum amount of the first range and the first amount of the second range. In any or all of the above examples, the method may additionally or alternatively further comprise transitioning port fuel injection from the calibrated minimum amount to a second amount responsive to a change in engine speed and load conditions from the first range to a third range, the third range including engine load above a second threshold load, higher than the first threshold load, and engine speed above a third threshold speed, higher than the second threshold speed, the second amount lower than the first amount and higher than the calibrated minimum amount. In any of the preceding examples comprising the transitioning, the transitioning may include transitioning from fueling the engine with the calibrated minimum amount of port injected fuel to fueling the engine with fuel delivered via port injection only in a fourth range, the fourth range including engine speed below the second threshold speed and engine load below a third threshold load, lower than the first threshold load. In any or all of the above examples, the calibrated minimum amount of port injected fuel is determined independent of a measured fuel temperature of the port injection fuel rail, and the calibrated minimum amount of port injected fuel is based on a modeled fuel temperature of the port injection fuel rail.

In any of the preceding examples, the method additionally or alternatively comprises delivering a remainder of a total fuel injection amount via direct injection. In any of the preceding example, the method additionally or alternatively comprises changing a ratio of fuel delivered via port fuel injection relative to direct fuel injection at a given engine speed, as engine load increases from a minimum load to a maximum load, while maintaining the port fuel injection at least at the minimum calibrated amount. In any of the examples including changing, the changing includes changing from a first ratio at the given engine speed and the minimum load to a second, different ratio at the given engine speed and the maximum load, each of the first ratio and the second ratio including at least the minimum calibrated amount of port injected fuel.

In any of the preceding example, the method additionally or alternatively comprises changing a ratio of fuel delivered via port fuel injection relative to direct fuel injection at a given engine load, as engine speed increases from a minimum speed to a maximum speed, while maintaining the port fuel injection at least at the minimum calibrated amount. In any of the examples including changing, the changing includes changing from a first ratio at the given engine load and the minimum speed to a second, different ratio at the given engine load and the maximum speed, each of the first ratio and the second ratio including at least the minimum calibrated amount of port injected fuel.

In any or all of the preceding examples, the method additionally or alternatively comprises, in response to deceleration fuel shut-off conditions being met, stopping fuel injection via each of a port injector coupled to the port injection fuel rail, and a direct injector coupled to the direct injection fuel rail, and re-enabling cylinder combustion based on a driver demand increase during a first condition, and during a second condition, re-enabling combustion in response to an estimated fuel rail temperature, without a driver demand increase.

Another example method for a dual fuel injection system, comprises: during conditions when fuel is requested via direct injection only; overriding the fuel request and delivering fuel as a first calibrated minimum amount of port injected fuel and a second, remaining amount of direct injected fuel. The preceding example, additionally or optionally, further comprises changing a ratio of the first amount relative to the second amount at a given engine speed, as engine load increases from a minimum load to a maximum load, while maintaining the first calibrated minimum amount of port injected fuel. In any or all of the preceding examples, additionally or optionally, the changing includes changing from a first ratio at the given engine speed and the minimum load to a second, different ratio at the given engine speed and the maximum load, each of the first ratio and the second ratio including at least the first calibrated minimum amount of port injected fuel. In any or all of the preceding examples, additionally or optionally, the method further comprises changing a ratio of the first amount relative to the second amount at a given engine load, as engine speed increases from a minimum speed to a maximum speed, while maintaining the port fuel injection at least at the first calibrated minimum amount of port injected fuel. In any or all of the preceding examples, additionally or optionally, the changing includes changing from a first ratio at the given engine load and the minimum speed to a second, different ratio at the given engine load and the maximum speed, each of the first ratio and the second ratio including at least the first calibrated minimum amount of port injected fuel. In any or all of the preceding examples, additionally or optionally, the conditions include a non-degradation mode of the fuel injection system and the engine being warmed up. In any or all of the preceding examples, additionally or optionally, the method further comprises modeling a fuel temperature of the port injection fuel rail; and estimating the calibrated minimum amount of port injected fuel based on the modeled fuel temperature.

Yet another example method for a dual fuel injection enabled engine comprises: over any and every engine non-starting operating condition, fueling the engine with at least a calibrated minimum amount of port injected fuel; and only partially fueling the engine with direct injected fuel over engine operating conditions. The preceding example method may additionally or alternatively comprise: in response to an engine speed-load transition, fueling the engine with more than the calibrated minimum amount of port injected fuel; and correspondingly decreasing fueling of the engine via direct injection. In any of the preceding examples, fueling the engine with more than the calibrated minimum amount of port injected fuel additionally or optionally includes fueling the engine with only port injected fuel; and not fueling the engine with direct injected fuel.

In this way, by maintaining port fuel injection at least at a calibrated minimum amount over all engine combusting conditions where the engine is warmed-up and non-starting fueling, fueling errors resulting from fueling heating (or boiling) and fuel vapor formation in a port injection fuel rail can be reduced. By trickling at least the calibrated minimum fuel amount through the port injection fuel rail even as engine speed-load conditions change, port fuel rail temperature control is enabled without the need for a dedicated temperature sensor, or complex fuel temperature control routines. By delivering the calibrated minimum amount of fuel via port injection even in engine speed-load ranges where only direct injection of fuel would otherwise have been commanded, temperature control is achieved more cost-effectively.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during a non-degradation mode of a dual injection system for delivering fuel to an engine,
pressurizing fuel, via raising a pressure of fuel above a pressure of a low pressure fuel pump, in each of a port injection fuel rail and a direct injection fuel rail via an engine-driven high pressure fuel pump, the port injection fuel rail coupled to a plurality of port fuel injectors each arranged in a respective engine intake air port, and the direct injection fuel rail coupled to a plurality of direct fuel injectors; and over any and every engine non-starting operating condition, after the engine is warmed up, fueling the engine with at least a calibrated minimum amount greater than zero of port injected fuel for every combustion event, the fueling including determining that the engine is operating in a warmed up non-starting operating condition where only direct injected fueling is requested, and in response, fueling the engine with at least the calibrated minimum amount of port injected fuel and delivering a remainder of a total fuel injection amount via direct injection for every combustion event.

2. The method of claim 1, wherein the fueling with at least the calibrated minimum amount is performed independent of a measured fuel temperature of the port injection fuel rail and over any and every warmed-up engine non-starting operating condition while in the non-degradation mode, and wherein pressurizing fuel via raising the pressure of fuel above the pressure of the low pressure fuel pump in each of the port injection fuel rail and the direct injection fuel rail includes passing fuel from the low pressure fuel pump through the high pressure fuel pump and to the direct injection fuel rail and passing fuel from the low pressure pump through the high pressure fuel pump and to the port injection fuel rail and maintaining the pressure of fuel in the port injection fuel rail at a first fixed pressure and controlling the pressure of fuel in the direct injection fuel rail to a second variable pressure, the first fixed pressure at least twice as great as the pressure of the low pressure fuel pump.

3. The method of claim 1, wherein the fueling includes maintaining port fuel injection at the calibrated minimum amount while overriding the request for only direct fuel injection as engine speed and load conditions change within a first range of engine speed-load conditions, the first range including engine speed above a first threshold speed and engine load above a first threshold load.

4. The method of claim 3, further comprising transitioning port fuel injection from the calibrated minimum amount to a first amount responsive to a change in the engine speed and load conditions from the first range to a second range of engine speed-load conditions, the second range including engine load below the first threshold load and engine speed above a second threshold speed, higher than the first threshold speed, the first amount higher than the calibrated minimum amount, wherein the transitioning includes delivering an amount of fuel via port injection, the amount linearly extrapolated between the calibrated minimum amount of the first range and the first amount of the second range.

5. The method of claim 4, further comprising transitioning port fuel injection from the calibrated minimum amount to a second amount responsive to a change in the engine speed and load conditions from the first range to a third range of engine speed-load conditions, the third range including engine load above a second threshold load, higher than the first threshold load, and engine speed above a third threshold speed, higher than the second threshold speed, the second amount lower than the first amount and higher than the calibrated minimum amount.

6. The method of claim 5, further comprising transitioning from fueling the engine with the calibrated minimum amount of port injected fuel to fueling the engine with fuel delivered via port injection only in a fourth range of engine speed-load conditions, the fourth range including engine speed below the second threshold speed and engine load below a third threshold load, lower than the first threshold load.

7. The method of claim 1, wherein the calibrated minimum amount of port injected fuel is based on a modeled fuel temperature of the port injection fuel rail and determined independent of a measured fuel temperature of the port injection fuel rail, and further comprising adjusting the calibrated minimum amount to maintain the modeled fuel temperature below a temperature that causes hot vapor formation.

8. The method of claim 1, further comprising, during a degradation mode of the dual injection system, operating the engine with only port injected fuel and engine torque limited to a first level when the degradation mode is responsive to direct injector degradation, and operating the engine with only direct injected fuel and engine torque limited to a second level, higher than the first level, when the degradation mode is responsive to port injector degradation.

9. The method of claim 1, further comprising changing a ratio of fuel delivered via port fuel injection relative to direct fuel injection at a given engine speed, as engine load increases from a minimum load to a maximum load, while maintaining the port fuel injection at least at the calibrated minimum amount.

10. The method of claim 1, further comprising, in response to deceleration fuel shut-off conditions being met, stopping fuel injection via each of the plurality of port fuel injectors and the plurality of direct fuel injectors, and re-enabling cylinder combustion based on a driver demand increase during a first condition, and, during a second condition, re-enabling cylinder combustion in response to an estimated fuel rail temperature, without a driver demand increase.

11. A method for a dual injection system for delivering fuel to an engine, comprising:
during any and every non-starting engine operating condition, after the engine is warmed up, when fuel is requested via direct injection only and while in a non-degradation mode of the system:
overriding the fuel request and delivering fuel, pressurized to a pressure above a pressure of a low pressure fuel pump via an engine-driven high pressure fuel pump, as a first calibrated minimum amount of port injected fuel and a second, remaining amount of direct injected fuel.

12. The method of claim 11, further comprising changing a ratio of the first amount relative to the second amount at a given engine speed, as engine load increases from a minimum load to a maximum load, while maintaining the first calibrated minimum amount of port injected fuel, the port and direct injected fuel from a same tank.

13. The method of claim 12, wherein the changing includes changing from a first ratio at the given engine speed and the minimum load to a second, different ratio at the given engine speed and the maximum load, each of the first ratio and the second ratio including at least the first calibrated minimum amount of port injected fuel.

14. The method of claim 11, further comprising changing a ratio of the first amount relative to the second amount at a given engine load, as engine speed increases from a minimum speed to a maximum speed, while maintaining a port fuel injection at least at the first calibrated minimum amount of port injected fuel, the port and direct injected fuel from a same tank.

15. The method of claim 14, wherein the changing includes changing from a first ratio at the given engine load and the minimum speed to a second, different ratio at the given engine load and the maximum speed, each of the first ratio and the second ratio including at least the first calibrated minimum amount of port injected fuel.

16. The method of claim 11, wherein the non-starting engine operating conditions include the non-degradation mode of the system and the engine being warmed up, and further comprising pressurizing fuel to a port injection fuel rail and a direct injection fuel rail to a pressure above the pressure of the low pressure fuel pump via passing the fuel from the low pressure fuel pump, through the high pressure fuel pump, and to each of the port injection fuel rail and the direct injection fuel rail, the port and direct injected fuel from a same tank.

17. The method of claim 11, further comprising:
modeling a fuel temperature of a port injection fuel rail; and
estimating the first calibrated minimum amount of port injected fuel based on the modeled fuel temperature and a temperature that causes hot vapor formation in the port injection fuel rail.

18. A method for an engine enabled with dual injection of fuel, comprising:
over any and every engine non-starting operating condition, after the engine is warmed up, while a fuel system is in a non-degradation mode, fueling the engine with at least a calibrated minimum amount of port injected fuel for each combustion event including when only direct injected fueling is requested; and
only partially fueling the engine with direct injected fuel over all engine operating conditions, when combustion is enabled, fuel in each of a port injection fuel rail and a direct injection fuel rail pressurized to a pressure that is raised relative to a pressure of a low pressure fuel pump via an engine-driven high pressure fuel pump, the port injection fuel rail coupled to a plurality of port fuel injectors each arranged in a respective engine intake air port, and the direct injection fuel rail coupled to a plurality of direct fuel injectors.

19. The method of claim 18, further comprising, in response to an engine speed-load transition,
fueling the engine with more than the calibrated minimum amount of port injected fuel; and
correspondingly decreasing fueling of the engine via direct injection.

20. The method of claim 19, wherein fueling the engine with more than the calibrated minimum amount of port injected fuel includes:
fueling the engine with only port injected fuel; and
not fueling the engine with direct injected fuel.

* * * * *